United States Patent

[11] 3,625,523

| [72] | Inventors | Willis W. Gardner |
| | | Waukesha; |
| | | Richard L. Rafferty, Menomonee Falls, both of Wis. |
| [21] | Appl. No. | 11,098 |
| [22] | Filed | Feb. 13, 1970 |
| [45] | Patented | Dec. 7, 1971 |
| [73] | Assignee | Waukesha Bearings Corporation Waukesha, Wis. |

[54] AFT SEALING ASSEMBLY FOR STERN TUBES
3 Claims, 2 Drawing Figs.

[52] U.S. Cl. .................................................. 277/59,
115/0.5, 416/174
[51] Int. Cl. .................................................. F16j 15/32
[50] Field of Search .......................................... 277/58, 59,
28; 114/0.5; 115/0.5; 416/174

[56] References Cited
UNITED STATES PATENTS

| 571,741 | 11/1896 | Bates ............................ | 277/59 |
| 1,056,282 | 3/1913 | Koerting et al. ............... | 277/28 |
| 1,586,967 | 6/1926 | Crickmer ....................... | 277/28 |
| 2,466,025 | 4/1949 | Hanson .......................... | 277/28 |
| 3,413,008 | 11/1968 | Greiner .......................... | 277/58 |
| 3,521,890 | 7/1970 | Holmes et al. ................. | 277/59 |

*Primary Examiner*—Robert I. Smith
*Attorney*—Morsell & Morsell

ABSTRACT: An annular casing which surrounds the tail shaft of a ship at the aft end of the stern tube has an annular space within which inner, outer and intermediate annular lip seals are supported for sealing around the tail shaft liner, the inner seal having its lip projecting in a forward direction and the intermediate and outer seals having their lips projecting in an aft direction. There is communication between the stern tube oil chamber and the forward side of the inner seal, and there is valve-controlled communication between the stern tube oil chamber and an annular pocket between the inner and intermediate seals. The valve is actuated by the pressure difference between the pressure in said annular pocket and the pressure in the stern tube oil chamber.

PATENTED DEC 7 1971

3,625,523

INVENTORS
WILLIS W. GARDNER
RICHARD L. RAFFERTY

BY Morsell & Morsell
ATTORNEYS

AFT SEALING ASSEMBLY FOR STERN TUBES

BACKGROUND OF THE INVENTION

1. Field of the Invention

The present invention is particularly suitable for use in connection with stern tube sealing on large ships, and is more particularly concerned with a sealing assembly at the aft end of the stern tube which seals against the loss of oil from the stern tube and against the admission of sea water.

2. Description of the Prior Art

While radial lip seals are desirable for the purpose of the present invention they have a certain disadvantage in that there is a maximum pressure difference on the two sides of the seal which can be handled. If this limitation is exceeded there is deformation of the flexible portions of the lip seal so that undesirably large contact areas can develop between the seal lip and the rotating member. These large contact areas can generate increased amounts of heat, raising the seal operating temperature. Deterioration of the elastomer of the seal may then result, with attendant leakage and seal failure. This type of failure is usually a gradual development over a period of time. In ships the stern tube oil pressure is desirably maintained at a value slightly in excess of the sea water pressure at the level of the propeller shaft. This provides for a small pressure difference across the aft stern tube seal (which is favorable for its operation) and favors the loss of oil rather than the ingress of sea water should any leak develop. Although the pressure difference across the aft seals is normally small, such as 2–5 p.s.i., it is fairly well established that pressure differences across the individual sealing rings which are embodied in the aft sealing assembly can become substantially greater. This has been determined by examining rings after use. Also it is a known fact that with conventional constructions, the oil pocket between the intermediate sealing ring and the inner sealing ring does not always remain flooded and pressurized, and also vacuums can develop in this annular pocket under certain conditions. If large pressure differences result there can be an adverse effect upon the conventional lip-type seals, as heretofore described.

SUMMARY OF THE INVENTION

The improved invention provides novel means for maintaining a desired minimum pressure in the annular pocket between the intermediate and inner sealing rings of an aft sealing assembly to eliminate the possibility of large pressure drops occurring across these rings.

A general object of the present invention is to provide novel means for controlling communication between the annular pocket, which is located between the intermediate and inner sealing rings, and the stern tube oil chamber whereby the pressure in said annular pocket is maintained at a desired value below the stern tube oil pressure to eliminate the danger of distorting the sealing rings, thus insuring optimum life of the sealing elements.

A further object of the invention is to provide means including a pressure-balance valve for maintaining a desired pressure within the annular pocket between the intermediate and inner seal rings of an aft sealing assembly.

A further object of the invention is to provide an aft sealing assembly which prevents the development of pressure differentials of the type which might create large contact areas between the seal lips and the rotating member, thereby decreasing the amount of heat generated by the seals and reducing deterioration of the elastomer.

With the above and other objects in view, the invention consists of the improved aft sealing assembly for stern tubes, and all of its parts and combinations, as set forth in the claims, and all equivalents thereof.

BRIEF DESCRIPTION OF THE DRAWING

In the accompanying drawing, illustrating one complete embodiment of the preferred form of the invention, in which the same reference numerals designate the same parts in all of the views.

DESCRIPTION OF THE PREFERRED EMBODIMENTS

Figure 1:
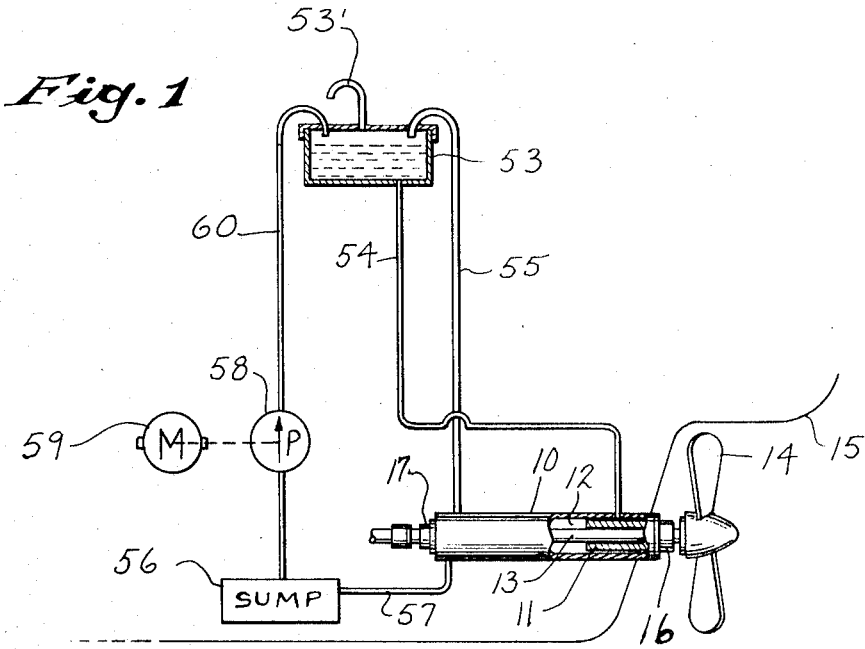
FIG. 1 is a partially diagrammatic view showing the stern tube oil system, part of the stern tube being broken away and shown in longitudinal section.

Referring more particularly to the drawings, the numeral 10 designates a stern tube having an aft bearing 11 and a similar forward bearing (not shown), and having an oil chamber 12 within the stern tube, the tail shaft 13 carrying the usual propeller 14 for a ship 15. Between the aft bearing and the propeller 14 is the annular casing 16 for the aft sealing assembly. At the forward end of the stern tube is the forward sealing assembly 17.

Figure 2:
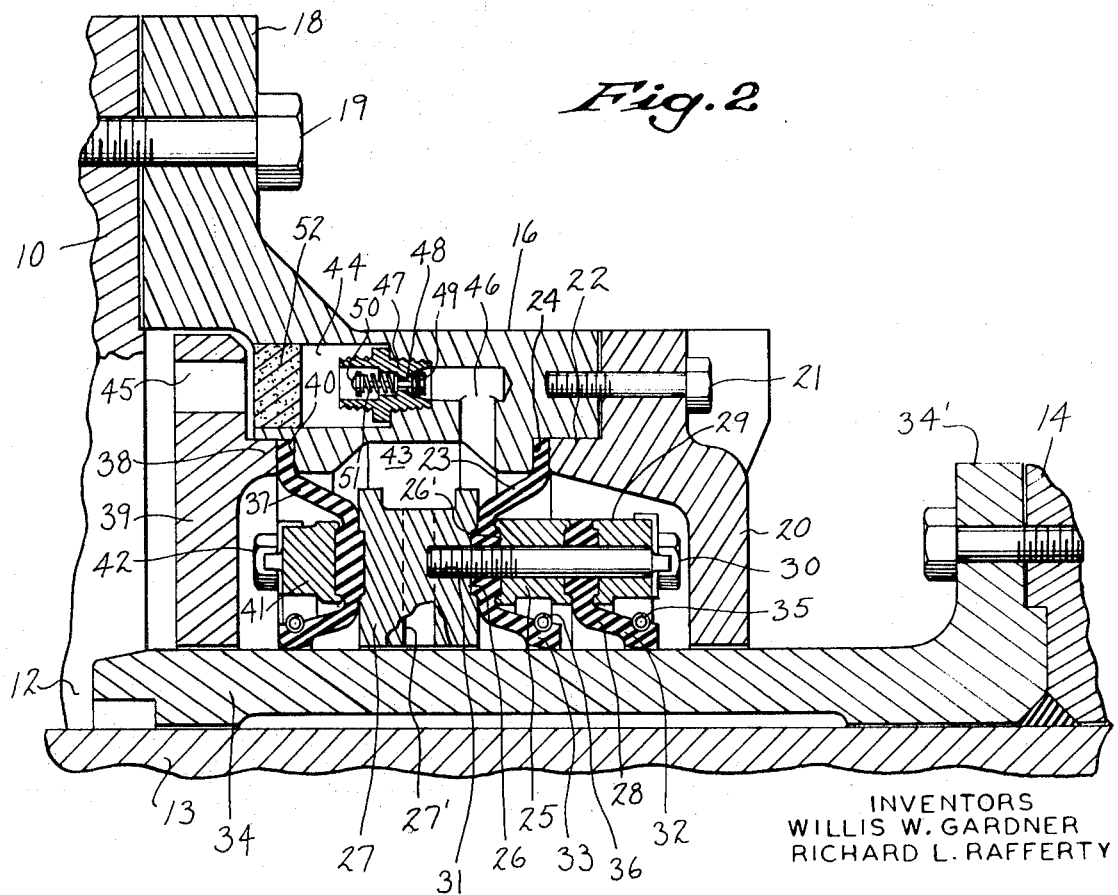
FIG. 2 is a fragmentary longitudinal sectional view through an aft sealing assembly.

The aft sealing assembly 16 forms the subject matter of the present invention and is illustrated more particularly in FIG. 2. Referring to said figure, the annular casing 16 has an annular flange 18 which is connected to the aft end of the stern tube 10 by bolts or the like 19. At the aft end of the casing 16 there is an annular cover 20 which is connected to the end of the casing by bolts 21, the cover having an annular projection 22 whereby the outer peripheral portion of an intermediate annular sealing member 23 is clamped between the end of the portion 22 and an annular casing shoulder 24. The intermediate portion of the seal is thickened and positioned between an annular support rings 25 and a groove 26 in one side of a guide ring 27, there also being a groove 26′ in the support ring 25. An annular outer seal 28 is positioned between the other side of the support ring 25 and a side of an additional support ring 29, the seal also having an annular thickened portion which is received in annular grooves in the support rings 25 and 29. Bolts 30 extend through registering openings in the annular support rings 29 and 25 and in the seals 28 and 23, and are threaded into openings 31 in the guide ring to secure the outer and intermediate seals in position with their sealing lips 32 and 33 engaging a liner 34 which is fast on the tail shaft 13. The aft end of the liner 34 is flanged as at 34′ and bolted to the hub of the propeller 14 as shown in FIG. 2. The usual garter springs 35 and 366 urge the lips into sealing engagement with the liner.

The inner annular seal 37 has its outer peripheral portion clamped between an annular extension 38 of a forward annular cover 39 and an annular casing shoulder 40. Intermediate its width the sealing ring is of an enlarged cross section with said portion clamped in grooves between the forward side of the guide ring 27 and the side of an annular support ring 41, there being bolts 42 extending through holes in the support ring 31 and sealing ring 37 and being threaded into the guide ring. There is clearance between the cover 39 and shaft liner 34 which affords communication with the stern tube oil chamber 12.

Between the sealing rings 23 and 37 is an annular pocket 43, there being radial holes 27′ in the guide ring 27 to provide communication between the inner and outer portions of the annular pocket 43.

A bore 44 in the forward end of the casing is in alignment with a bore 45 in the cover, the bore being in communication with the annular chamber 43 by way of an L-shaped passageway 46. The cover bore 45 is in communication with the stern tube oil chamber 12. Between the L-shaped passageway 46 and the bore 44 is a valve fitting 47 having a valve seat 48 with which a valve 49 coacts. The latter is mounted on a stem 50 and is normally urged to closing position by a spring 51. In the forward end of the casing bore 44 is a filter plug 52 of porous bronze, stacked mesh, or other suitable material.

The system shown in FIG. 1 includes a head tank 53 with a vent 53′. Oil in the tank is connected by a line 54 with the oil chamber 12. A vent tube 55 provides for the escape of air from the stern tube chamber 12. A sump tank 56 is connected with a return line 57 from the oil chamber 12. A pump 58 driven by an electric motor 59 returns oil from the sump to the head tank 53, through line 60.

The sealing rings 28, 23 and 37 are well known annular lip seals and are formed of suitable elastomeric material such as rubber or synthetic rubber capable of retaining lubricating oil in the stern tube. The material is preferably a copolymer of butediene and acrylonitrile such as Buna-N The guide rings and support rings are of suitable metal. The lip of the seal 37 projects in a forward direction (relative to the ship) and the lips of the seals 23 and 28 project in an aft direction.

OPERATION

In operation, the pressure difference across the aft seals is normally small as it is the difference between the water pressure at the shaft level and the pressure in the stern tube oil chamber 12, this presence being fixed by the head tank 53. Oil is being continuously circulated by the pump 58 to maintain circulation in the chamber 12.

Although the pressure difference across the aft seals is normally small (usually 2–5 p.s.i.), it is fairly well established that pressure differences across the individual sealing rings 23, 28 and 37 of FIG. 2 can be substantially greater. This has been established by examination of rings after use and by test. Also, sometimes the oil space in the chamber 43 does not remain flooded and pressurized, and also a vacuum might develop in this space under certain conditions.

The improved construction of the present application insures that a predetermined pressure at a fixed value below the stern tube oil pressure will be maintained in the pocket 43 between the rings 23 and 37. By insuring the maintenance of such pressure, possibility of large pressure drops across these rings is eliminated. This is accomplished in the present invention by the novel pressure valve arrangement shown in FIG. 2. As a part of this arrangement the pocket 43 is connected to the stern tube oil chamber by the ducts 46, 44 and 45 under control of the valve member 49. A pressure balance valve is employed having a setting such that the pressure in the pocket 43 is maintained at a fixed value below the stern tube oil pressure in the chamber 12, this being accomplished by the pressure of the valve spring 51. The valve is so set for the conditions of the particular ship that if the pressure in the space 43 drops (relative to the stern tube oil pressure) then the stern tube oil pressure will be strong enough to open the valve 49 against the spring 51 to reestablish the proper pressure in the pocket 43. If the pressure within the pocket 43 increases beyond a desired value, slight leakage which takes place past the sealing lips will soon lower it. The pressure in the spaces between the ring lips 32 and 33 is automatically maintained at substantially the same pressure as exists in the space 43, because the annular lip 33 can give in an outward direction if the pressure in the chamber 43 is high enough to permit leakage into the annular space between the lips 32 and 33.

The lip 32 will not leak in a similar manner because it is subjected to the sea water pressure from the other side.

It is to be noted that the spring-loaded valve 49 is exposed only to oil, not to the sea water. In addition, it is protected from foreign matter by the filter plug 52. This filter plug also serves to limit oil leakage, in the remote event that valve failure should cause the valve to remain open.

It is apparent that by the use of the improved aft seal assembly the oil pressures on the sealing elements 23, 28 and 37 are maintained at such a value as to prevent deformation of the flexible sealing lips such as would cause large contact areas between the lips and liner to raise the seal operating temperatures and cause deterioration of the elastomer of which the sealing rings 32, 33 and 37 are made. At the same time sufficient oil pressures are maintained to prevent the undesired entrance of sea water.

It is to be understood that I do not desire to be limited to the exact details of construction shown and described, for obvious modifications will occur to a person skilled in the art.

What we claim is:

1. A sealing assembly for effecting a seal adjacent the stern tube oil chamber around the tail shaft of a ship wherein there is means for maintaining the oil in said chamber under a pressure slightly greater than sea water pressure at the level of the tail shaft, said assembly including an annular casing having an annular cavity within which axially spaced annular lip seals are supported to provide an annular pocket therebetween, one of which seals has a face exposed to the pressure of oil in said stern tube chamber, the improvement comprising valve-controlled communication between said annular pocket and said oil chamber, and including a valve of a type which is actuated by the pressure difference between the pressure in said annular pocket and the pressure in said stern tube oil chamber, said valve having a spring-urged valve stem normally maintaining the valve closed, said valve being so disposed and its spring having such rating that the valve is automatically opened when the pressure in the liquid chamber exceeds the pressure in the annular pocket by a predetermined amount equal to the force exerted by the valve spring.

2. A sealing assembly as claimed in claim 1 in which said seal which has a face exposed to the pressure of liquid in the stern tube oil chamber has an annular lip projecting toward the stern tube oil chamber, and in which the other of said axially spaced lip seals has an annular lip projecting in an aft direction.

3. A sealing assembly as claimed in claim 2 in which there is an additional annular lip seal aft of the seal which the lip projecting in an aft direction, said additional seal also having its annular lip projecting in an aft direction.

* * * * *